United States Patent
Kujira

(10) Patent No.: US 6,674,191 B2
(45) Date of Patent: Jan. 6, 2004

(54) MOTOR ACTUATOR CONTROL SYSTEM AND METHOD FOR CONTROLLING MOTOR ACTUATOR

(75) Inventor: Yukinobu Kujira, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/093,802

(22) Filed: Mar. 11, 2002

(65) Prior Publication Data

US 2002/0130567 A1 Sep. 19, 2002

(30) Foreign Application Priority Data

Mar. 14, 2001 (JP) ........................................ 2001-072327

(51) Int. Cl.[7] .............................. H02K 7/00; G01P 3/46
(52) U.S. Cl. ................. 310/68 B; 310/68 C; 310/68 R; 310/75 R; 324/177; 361/118
(58) Field of Search .......................... 310/68 B, 68 C, 310/75 R, 68 R; 361/118, 23, 31, 51; 324/177

(56) References Cited

U.S. PATENT DOCUMENTS

| | | | | |
|---|---|---|---|---|
| 4,788,497 A | * | 11/1988 | Katsumura | .................. 324/177 |
| 5,693,993 A | * | 12/1997 | Ito et al. | .................... 310/68 B |
| 6,107,712 A | * | 8/2000 | Yamamura et al. | ........ 310/68 B |
| 6,404,084 B1 | * | 6/2002 | Niki et al. | ................. 310/75 R |
| 6,471,580 B2 | * | 10/2002 | Ro | ............................... 454/69 |
| 6,498,481 B2 | * | 12/2002 | Apel | ........................ 324/207.2 |

\* cited by examiner

*Primary Examiner*—Burton Mullins
(74) *Attorney, Agent, or Firm*—Posz & Bethards, PLC

(57) ABSTRACT

A motor actuator control system includes a motor actuator having a motor, an output shaft for outputting rotation of the motor at reduced speed, and a gear train for transmitting rotation to the output shaft while reducing rotataional speed. The system further includes a first detector detecting current surges generated when contact between a commutator and brushes in the motor is broken, a second detector detecting a predetermined rotational position of a gear, and a control unit for controlling the motor on the basis of signals from the first detector and signals from the second detector. When the predetermined rotational position is detected, the position and the count of the current surges are correlated. Then, the motor is driven until the count reaches a predetermined number to rotate the output shaft to another predetermined rotational position.

14 Claims, 10 Drawing Sheets

MOTOR ACTUATOR CONTROL SYSTEM AND METHOD FOR CONTROLLING MOTOR ACTUATOR

CROSS REFERENCE TO RELATED APPLICATION

This application is based on and incorporates herein by reference Japanese Patent Application No. 2001-72327 filed on Mar. 14, 2001.

FIELD OF THE INVENTION

The present invention relates to a motor actuator control system in which the number of rotations (rotational position shift amount) of a motor is detected to control the motor. The present invention is preferably applied to, for example, an air conditioning system for a vehicle in which a switching member such as a damper and an air mixing door of an air passage is driven by a motor actuator. In the air conditioning system, the position of the switching member is accurately controlled by the motor actuator control system of the present invention.

BACKGROUND OF THE INVENTION

A switching member such as a damper and an air mixing door is used to switch the air flow mode between internal air circulation and exterior air introduction, to change air flow passages leading to interior air outlet ports, and to control air mixing rate between hot air and cool air in an air conditioning system for a vehicle. Those actions in response to an operation of switches close to the driver's seat are implemented by driving the switching member using a motor actuator. To ensure that the switching member is moved to a predetermined position, the position and the position shift amount of the switching member needs to be detected, and a motor in the actuator needs to be controlled on the basis of the detected information.

A system using current surges periodically generated in the motor is proposed to detect the position and the position shift amount of the switching member. In the motor, a commutator rotated synchronously with a rotor slides on and discontinuously contacts brushes to pass an electric current to rotor coils, so the contact between the commutator and the brushes is periodically made and broken. A current surge (commutator surge) is generated at the moment that the contact is broken, so commutator current surges are periodically generated. Thus, the number of rotations of the motor (rotational position shift amount) is detected by counting the commutator current surges, and the position shift amount of the switching member can be determined based on the number of the surges.

The commutator current surges are generated a plurality of times per one rotation of the rotor, so the detection based on commutator current surge count is basically accurate. However, the commutator current surges are so weak when the motor starts and stops rotating that weak commutator current surges are not always detected. In addition, the commutator current is generated only while the motor is electrically powered, so the commutator current surge count becomes inaccurate if the rotor rotates by its own momentum or is rotated by unexpected force after the motor is switched off. Therefore, the detection based on the commutator current surge count is not reliable enough.

SUMMARY OF THE INVENTION

The present invention has been made in view of the above aspects with an object to provide a motor actuator control system in which the number of rotations (rotational position shift amount) of a motor is accurately controlled by correlating a count of commutator surge current and a predetermined rotational position of a gear in a gear train connected to the motor.

In the present invention, the motor actuator control system includes a motor actuator having a motor, an output shaft for outputting rotational motion of the motor at reduced rotational speed, and a gear train constituted of a plurality of gears to transmit rotational motion of the motor to the output shaft while reducing rotational speed. The control system further includes a first detector detecting commutator current surges, a second detector detecting a predetermined rotational position of a gear, and a control unit controlling the motor on the basis of a signal from the first detector and another signal from the second detector.

The commutator current surges are counted by the control unit. When the second detector detects the predetermined position of the output gear which is connected to the output shaft and rotated at the slowest speed in the gear train, the count of the commutator current surges is correlated with the predetermined rotational position by substituting a predetermined number for the count. Then, the motor is driven until the count reaches another predetermined number in order to rotate the output shaft to another predetermined rotational position.

BRIEF DESCRIPTION OF THE DRAWINGS

The above and other objects, features and advantages of the present invention will become more apparent from the following detailed description made with reference to the accompanying drawings.

In the drawings.

DETAILED DESCRIPTION OF THE PREFERRED EMBODIMENT

Figure 1:
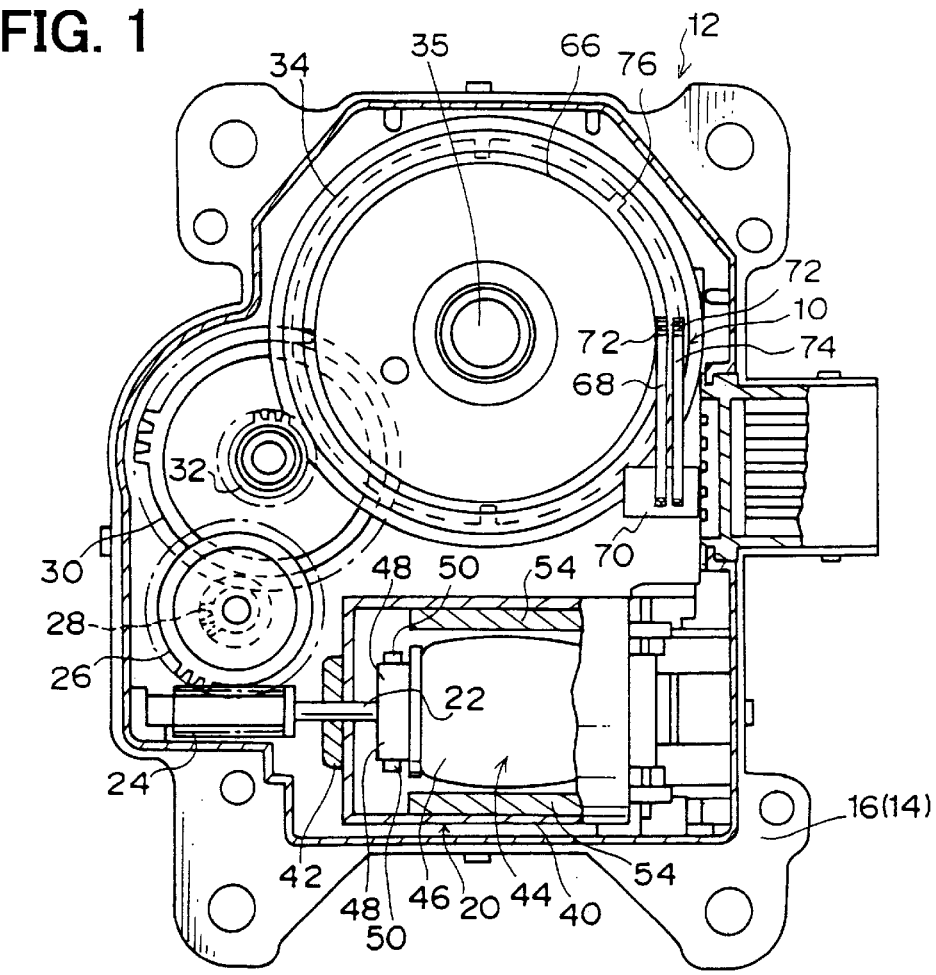
FIG. 1 is a plan view of a motor actuator according to an embodiment of the present invention.

The present invention will be described in detail with reference to an embodiment and various modifications of the embodiment, in which the same reference numerals designate same or similar members.

(Embodiment)

Figure 7:
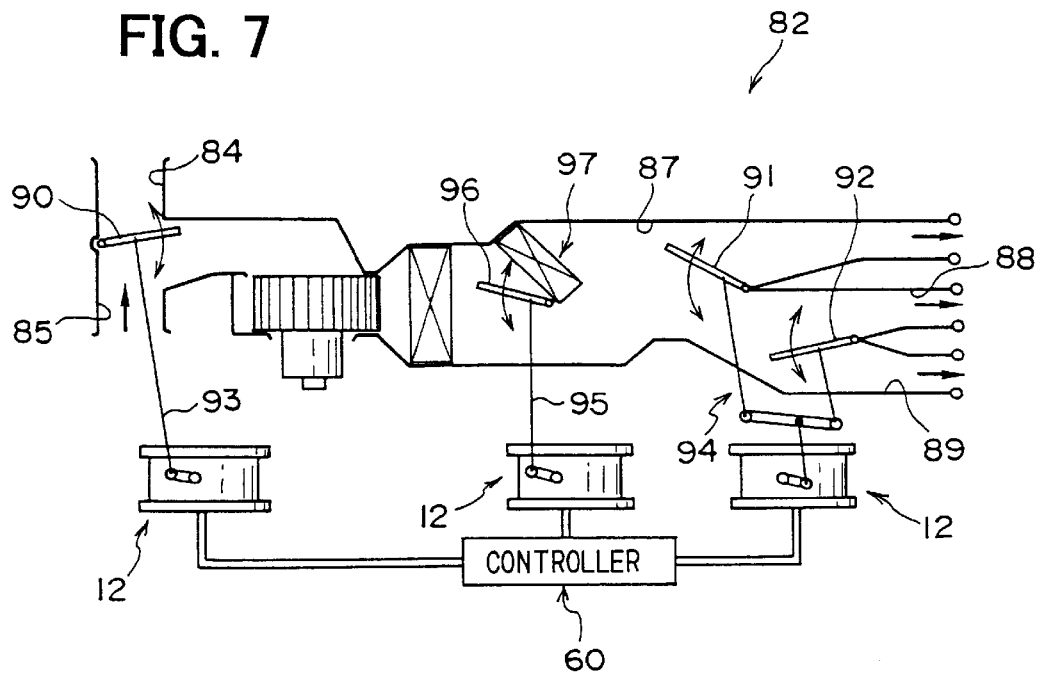
FIG. 7 is a schematic view of an air conditioning system for a vehicle to which the motor actuator control system according to the embodiment is applied.

As shown in FIG. 1, a motor actuator 12 has a housing 14 constituted of a main case 16 and a lid (not illustrated). The case 16 is approximately box-shaped and has an opening. The lid closes the opening to shield the case 16. The case 16 stores a DC motor 20 having a rotary shaft 22. A worm gear 24 is coaxially attached to the end of the shaft 22. The worm gear 24 meshes with a worm wheel 26 disposed by the gear 24. The worm wheel 26 has a support shaft constituted of a bottom shaft and a lid shaft. The bottom shaft and the lid shaft are rotatably supported by a pair of bearings (not illustrated) respectively formed on the bottom of the case 16 and on the lid. A gear 28 is formed on the bottom shaft of the worm wheel 26 in a coaxial relation with the worm wheel 26. The gear 28 meshes with a gear 30 disposed by the gears 26, 28. The gear 30 has a support shaft constituted of a bottom shaft and a lid shaft. The bottom shaft and the lid shaft are rotatably supported by a pair of bearings (not illustrated) respectively formed on the bottom of the case 16 and on the lid. A gear 32 is formed on the bottom shaft of the gear 30 in a coaxial relation with the gear 30. The gear 32 meshes with an output gear 34 disposed by the gear 32. The output gear 34 has a bottom shaft and an output shaft 35. The bottom shaft and the output shaft 35 are rotatably supported by a pair of bearings (not illustrated) respectively formed on the bottom of the case 16 and in the lid. The output shaft 35 penetrates the lid of the case 14 to be connected to a damper 90, 91, 92 or an air mixing door 96 in an air conditioning system 82 for a vehicle as shown FIG. 7.

The air conditioning system 82 has three motor actuators 12. Each actuator 12 is electrically connected to and controlled by a controller 60. The first motor actuator 12 is mechanically connected to the damper 90 using a link 93. The damper 90 switches air flow path between a duct 85 for introducing interior air and a duct 84 for introducing exterior air. The second motor actuator 12 is mechanically connected to the dampers 91 and 92 using links 94. The damper 91 switches air flow path between a duct 86 leading to a defroster and a duct 87 leading to interior air outlet ports. The damper 92 switches air flow path between a duct 88 leading to an air outlet port close to the instrument panel and a duct 89 leading to an air outlet port close to passengers' feet. The third motor actuator 12 is mechanically connected to the door 96 using a link 95 for controlling air mixing rate between hot air generated by a heater core 97 and cool air.

When the motor 20 is driven and the shaft 22 is rotated, the rotational motion of the shaft 22 is transmitted to the output gear 34 through a gear train constituted of the worm gear 24, the worm wheel 26, and the gears 28, 30, and 32 while rotational speed is reduced. The output shaft 35, which is connected to the link 93, 94, 95 converting rotary movement of the output shaft 35 of the actuator 12 into reciprocative movement of the damper 90, 91, 92 or the door 96, drives a related switching member. For example, the motor actuator 12 used for moving the damper 90 closes either one of the ducts 84 and 85 to stop air flow. For the sake of brevity, explanation on this embodiment and following modifications will be made referring only to the motor actuator 12 used for moving the damper 90.

Figure 3:
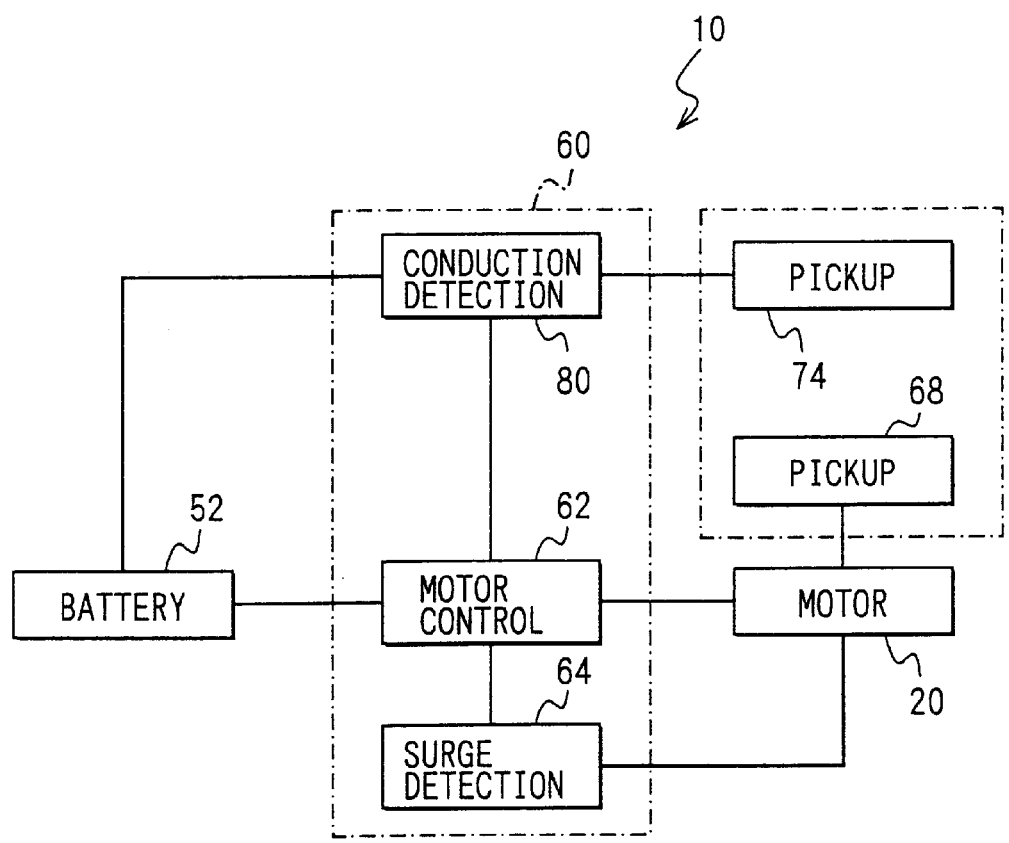
FIG. 3 is a schematic block diagram of a motor actuator control system according to the embodiment.

A yoke 40 which doubles a housing for the motor 20 has a bearing 42 supporting rotatably the shaft 22. The yoke 40 stores a rotor 44 which is coaxially penetrated by the shaft 22 and rotated synchronously with the shaft 22. The rotor 44 is wound with a wire forming a coil 46. Magnetic fields are generated when electricity is passed through the coil 46. The rotor 44 has a commutator 48 at one end in the direction of the rotation axis of the rotor 44. The commutator 48 is constituted of a pair of electrodes which are electrically connected to the coil 46. Those electrodes of the commutator 48 are integrated with the rotor 44 and the shaft 22 so as to face each other around the shaft 22. A pair of brushes 50 is disposed in the yoke 40. One brush 50 contacts one electrode of the commutator 48, and the other brush 50 contacts the other electrode. As shown in FIG. 3, those brushes are electrically connected to a battery 52 using a lead wire or the like. Electricity is passed from one brush 50 to the other through one electrode, the coil 46, and the other electrode.

A pair of permanent magnets 54 are disposed in the yoke 40. Those magnets 54 are attached to the inner surface of the yoke 40 so as to face the coil 46 around the rotation axis of the shaft 22. The yoke 40 is made of a metal to provide a magnetic flux path. The rotor 44 is rotated due to an interaction between the magnetic field of the coil 46 generated when electricity is passed through the coil 46 and the magnetic field of those magnets 54.

As shown in FIG. 3, the motor 20 is electrically connected to a motor control circuit 62 in an electronic control unit 60 of a motor actuator control system 10. The circuit 62 controls the electricity supplied from the battery 52 to the motor 20. The motor 20 is also connected to a commutator current surge detection circuit 64 in the control unit 60, which monitors a current (motor current) passed through the motor 20.

In the motor 20, the commutator 48 rotated synchronously with the rotor 44 discontinuously contacts and slides on the brushes 50 to pass the electric current to the coil 46, so the contact between the commutator 48 and the brushes 50 is periodically made and broken. The commutator current surges are generated due to the self-induction of the coil 46 at the moment that the contact is broken, so the motor current passed through the motor 20 increases momentarily.

The circuit 64 sends a signal (commutator surge signal) to the circuit 62 when the circuit 64 detects the commutator current surges, that are larger than a predetermined threshold intensity. The circuit 62 controls the motor 20 on the basis of the count of the commutator surge signal.

The contact between the commutator 48 and the brushes 50 is made and broken due to the rotation of the commutator 48. Therefore, the count of the commutator current surges is correlated to that of rotation of the motor 20 (shaft 22) and to the rotational position (position shift amount) of the output shaft 35 driven by the motor 20. The count is also correlated to the position (position shift amount) of the damper 90. Thus, the position (position shift amount) of the output shaft 35 (the damper 90) is accurately controlled by counting accurately the commutator current surges.

Figure 2:
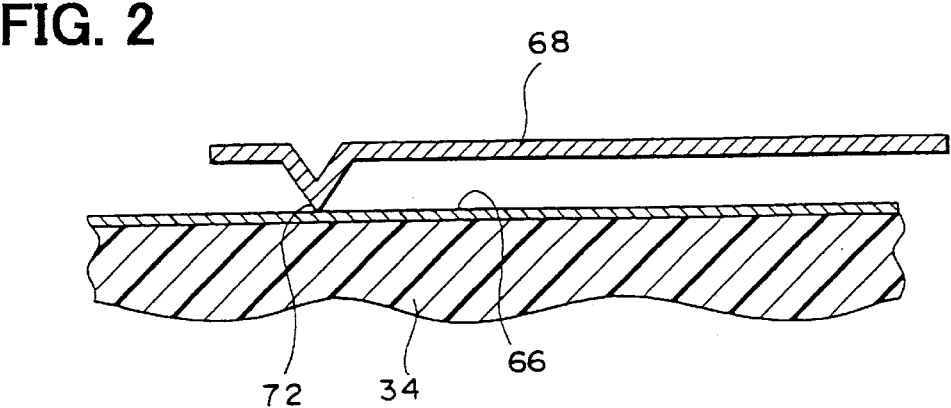
FIG. 2 is a side view of a pickup used in the embodiment.

As shown in FIG. 1, the output gear 34 has a pulse plate 66 on the surface facing the lid of the housing 14. The pulse plate 66 is made of an electrically conductive material such as metal, is in the shape of a ring, and is attached to the output gear 34 in a coaxial relation. A pickup 68 is disposed on the same side of the output gear as the plate 66 is formed. The pickup 68 is a resilient thin stick-like plate made of an electrically conductive material such as metal. One end of the pickup 68 is fixed to a plate 70 disposed in the proximity of the circumference of the output gear 34. The plate 70 is supported by either of the main case 14 or the lid of the housing 14. The other end of the pickup 68 has a V-shaped sliding part 72 at which the pickup 68 continuously contacts the pulse plate 66, as shown in FIG. 2. In this embodiment, the part 72 is V-shaped. However, other shapes such as U-shape may be used as well.

Beside the pickup 68, a pickup 74 is disposed. The pickup 74 has substantially the same structure as the pickup 68. A V-shaped sliding part 72 of the pickup 74 is placed outside of the pulse plate 66 so as not to contact the plate 66. A projection part 76 protruding outwardly from the pulse plate 66 is formed on the output gear 34. The projection part 76 is made of the same electrically conductive material as used for the pulse plate 66. The pulse plate 66 and the projection part 76 are fixed to the output gear 34 to be rotated synchronously with the gear 34. The sliding part 72 of the pickup 74 is disposed on the track of the projection part 76. Therefore, the pickups 68, 74, the pulse plate 66, and the projection part 76 constitute an electrical switch. The switch is turned on when the motor 20 is driven and the projection part 76 meets the sliding part 72 of the pickup 74 at a predetermined rotational position of the output gear 34. A current (conduction current) due to the conduction of the switch is detected by a conduction detection circuit 80 in the control unit 60, as shown in FIG. 3.

In this embodiment, the switch is formed on the output gear 34 which is rotated at the slowest speed in the gear train, so the sliding part 72 has the least sliding distance and the smallest abrasion. Therefore, the durability of the part 72 is improved. However, the switch can be formed on other gears.

Figure 4:
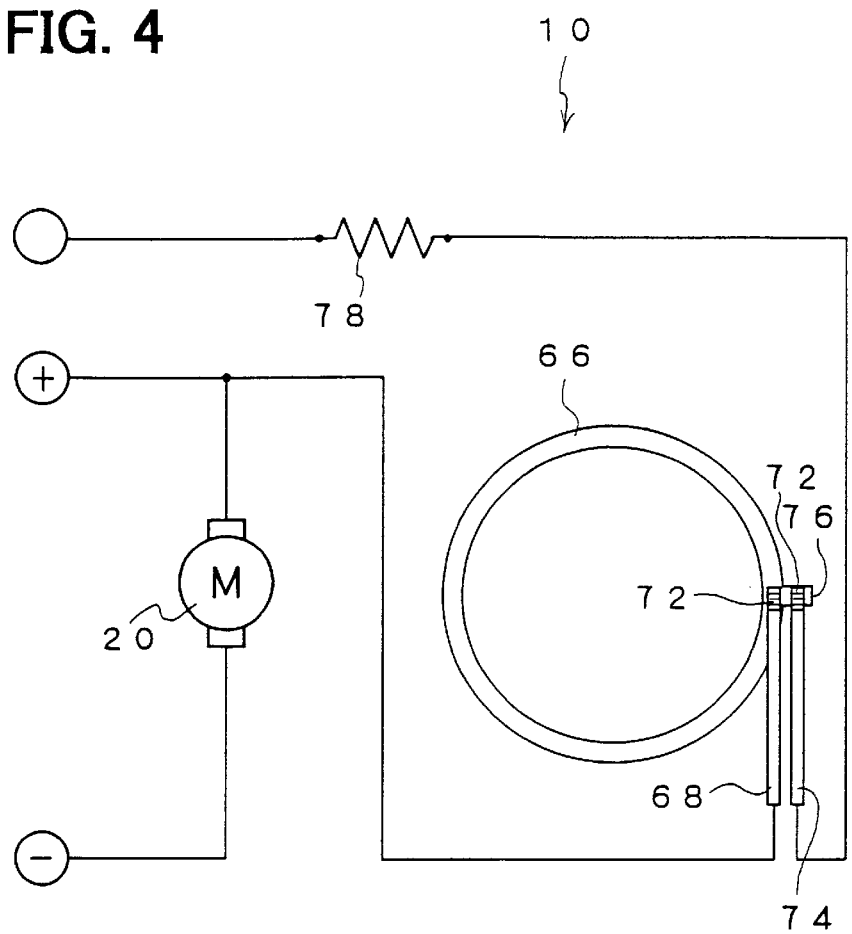
FIG. 4 is a schematic circuit diagram of the motor actuator control system according to the embodiment.
Figure 5:
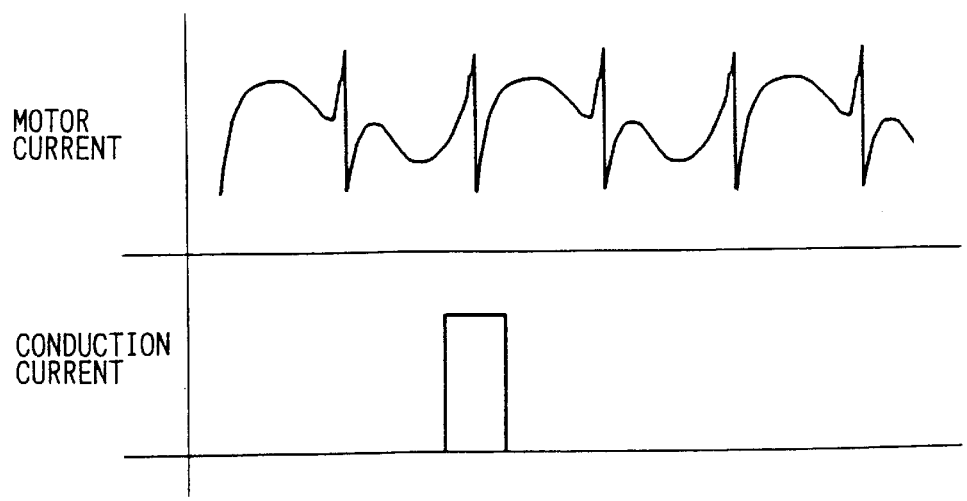
FIG. 5 is a time chart showing the correlation between commutator current and compensational signal (conduction current)

The pickup 68 is connected to the positive pole of the battery 52. The pickup 74 is connected to a resistor 78, and the resistor 78 is connected to the conduction detection circuit 80, as shown in FIGS. 3 and 4, so the conduction current is output separately from the current passed through the motor 20 when the switch is turned on. The circuit 80 is electrically connected to the motor control circuit 62 to send a signal (conduction signal) caused by the conduction current.

Figure 6:
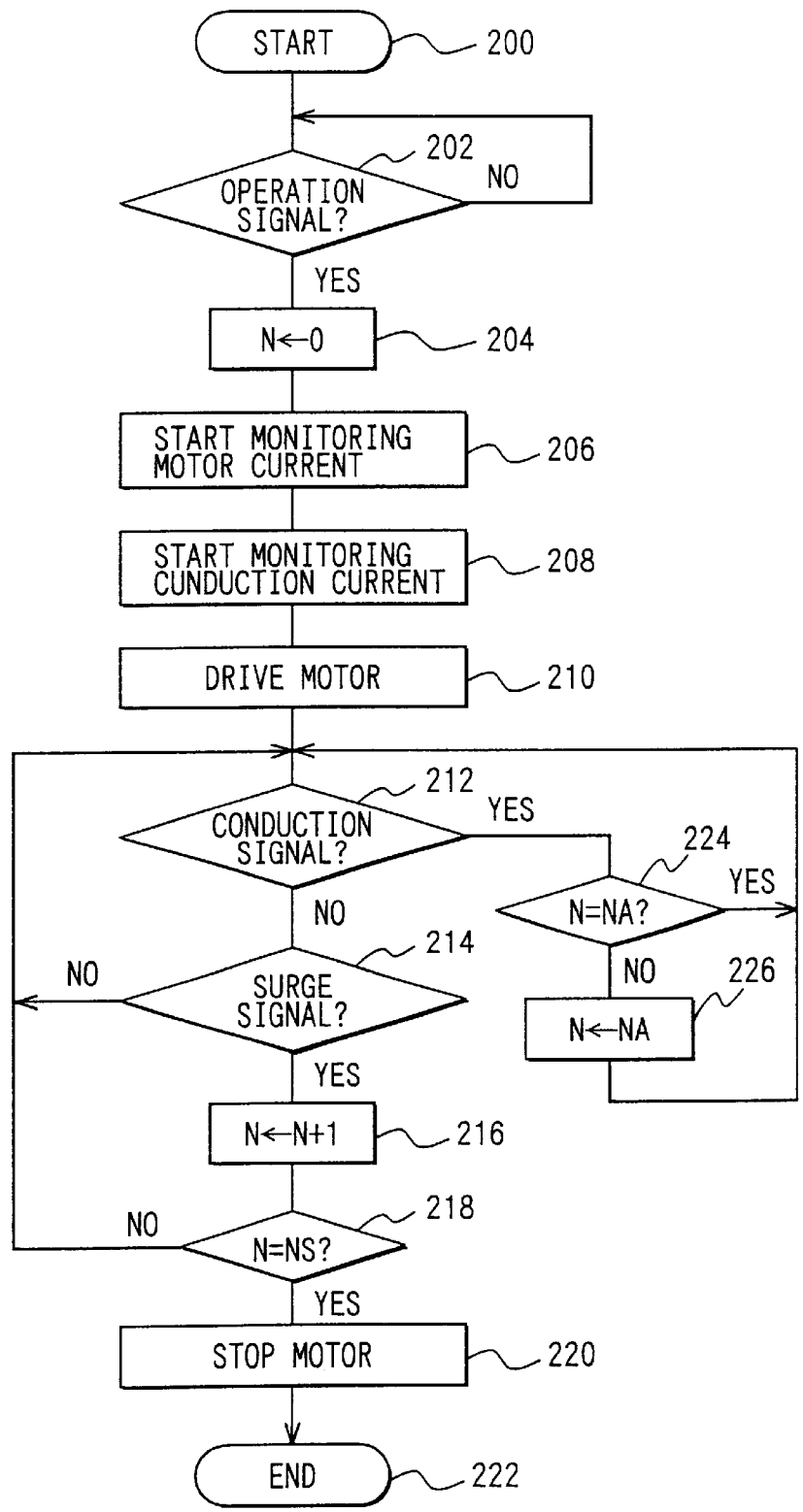
FIG. 6 is a flow chart showing a routine to control the motor actuator control system according to the embodiment.

The motor control circuit 62 controls the motor 20 on the basis of a control routine shown in FIG. 6. After the motor actuator control system 10 is set to function at step 200, whether an operation signal from an operation switch (not illustrated) is received or not is determined at step 202. If not, step 202 is repeated awaiting the operation signal. If the operation signal is detected at step 202, a count N of the commutator current surges is reset by substituting zero for the count N at step 204. Then, the commutator current surge detection circuit 64 is set to monitor the motor current passed through the motor 20 at step 206. The conduction detection circuit 80 is set to monitor the conduction current. Afterward, the motor 20 is driven at step 210.

At step 212, whether the circuit 62 receives the conduction signal or not is determined. If the conduction signal is received, whether the count N of the commutator current surge is equal to a predetermined count NA or not is determined at step 224.

The count N is bound to be equal to the predetermined count NA if the rotational position of the shaft 22 is at a predetermined position when the motor 20 is turned on and the commutator current surges generated right after the motor 20 is turned on are strong enough to be detected by the commutator current surge detection circuit 64. If the count N is equal to the predetermined count NA, step 212 is repeated.

The count N is not equal to the predetermined count NA if the rotational position is shifted from the predetermined position due to an expected external force or if the commutator current surges are weak. In the case that the count N is not equal to the predetermined count NA, the count N is corrected by substituting the predetermined count NA for the count N. Then, step 212 is repeated. In this correction, even if the real rotational position of the shaft 35 is shifted from a detected position based on the count N, the correlation between them is retrieved using the conduction signal. Therefore, the reliability in controlling the rotational position of the shaft 35 is improved.

If the conduction signal is not received at 212, whether the circuit 62 receives the commutator surge signal or not is determined at step 214. As described above, the commutator surge signal is sent from the circuit 64 to the circuit 62 when the circuit 64 detects the commutator surge current larger than a predetermined threshold intensity. If the commutator surge signal is not received at step 214, step 212 is repeated. If received, one is added to the count N at step 216, and then step 218 is executed. At step 218, whether the count N reaches another predetermined count NS or not is determined. If not, step 212 is repeated. If the count N reaches the count NS, step 220 is executed to stop the motor 20, and then the routine is ended at step 222.

In the motor actuator 12 used for moving the damper 90, the count NS is the count of the commutator current surges generated while the damper 90 closing one of the ducts 84 and 85 is moved to the position where the damper 90 closes the other. Therefore, the damper 90 is surely moved to the position by turning off the motor 20 when the count N reaches the predetermined count NS.

A commutator current surge is generated at the moment that the contact between the commutator 48 and the brushes 50 is broken. In addition, the rotational motion of the shaft 22 is transmitted to the output shaft 35 with reduced rotational speed in the motor actuator 12. Therefore, the count of the commutator current surges generated while the output gear 34 spins once is the product of the inverse of the overall speed reduction ratio and the number of electrodes constituting the commutator 48. Thus, the motor 20 is precisely controlled on the basis of the count of the commutator current surges in the motor actuator control system 10.

(First Modification)

Figure 8:
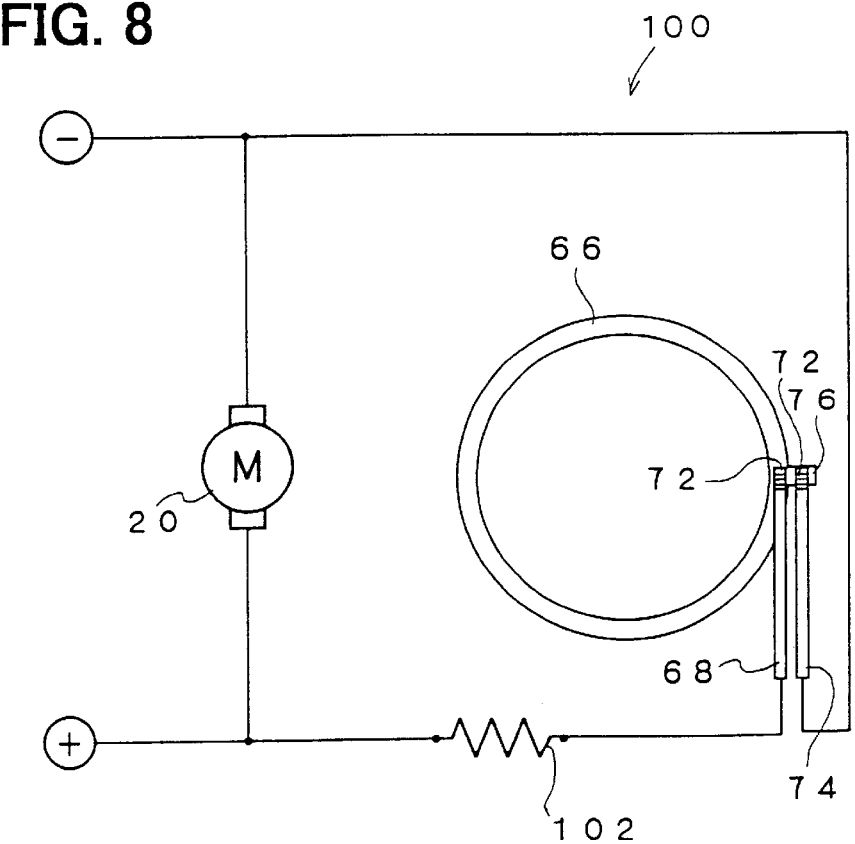
FIG. 8 is a schematic circuit diagram of a motor actuator control system according to the first modification of the embodiment.

As shown in FIG. 8, the motor 20 and the pickups 68, 74 are connected electrically in parallel in a motor actuator control system 100. The pickup 68 is electrically connected to the positive pole of the battery 50, to which one brush 50 is electrically connected, with a resistor 102 interposed between the pole and the pickup 68. The pickup 74 is electrically connected to the negative pole of the battery 50 to which the other brush 50 is electrically connected. In this modification, the positive and the negative poles of the battery 52 are respectively assigned to the pickups 68, 74. However, the opposite assignment may be used.

Figure 9:
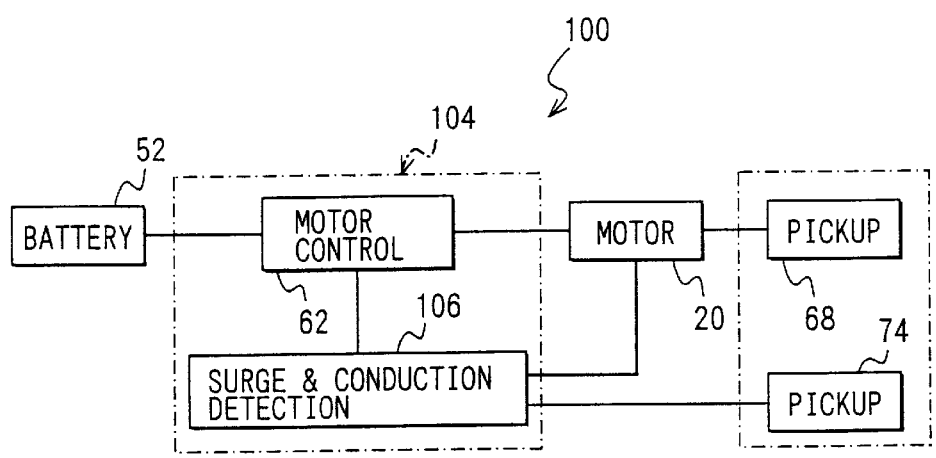
FIG. 9 is a schematic block diagram of the motor actuator control system according to the first modification.
Figure 10:
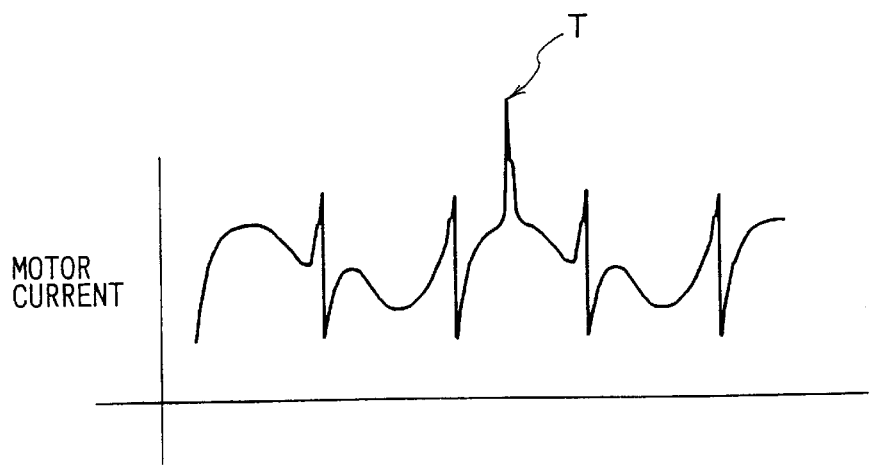
FIG. 10 is a time chart showing the correlation between commutator current and compensational signal (conduction current) according to the first modification.

As shown in FIG. 9, the motor actuator control system 100 has a control unit 104 constituted of the motor control circuit 62 and a commutator surge and conduction signal detection circuit 106. The detection circuit 106 monitors the motor current passed through the motor 20 and sends the commutator surge signal to the motor control circuit 62 in the control unit 104 when the circuit 106 detects a commutator current surge. The detection circuit 106 also detects the conduction current passed between the pickups 68, 74 and sends the conduction signal to the motor control circuit 62 when the circuit 106 detects the conduction current. The conduction current provides a much higher peak T than a peak due to the commutator current surges in the motor current, as shown in FIG. 10. The motor control circuit 62 controls the motor 20 on the basis of the commutator surge signals and the conduction signals according to the control routine shown in FIG. 6.

In this modification, the motor 20 and the pickups 68, 74 are connected electrically in parallel in a motor actuator control system 100, so a wiring harness connecting the pickup 74 to the conduction detection circuit 80 in the embodiment is needless and the system 100 becomes simpler in structure than the system 10.

(Second Modification)

Figure 11:
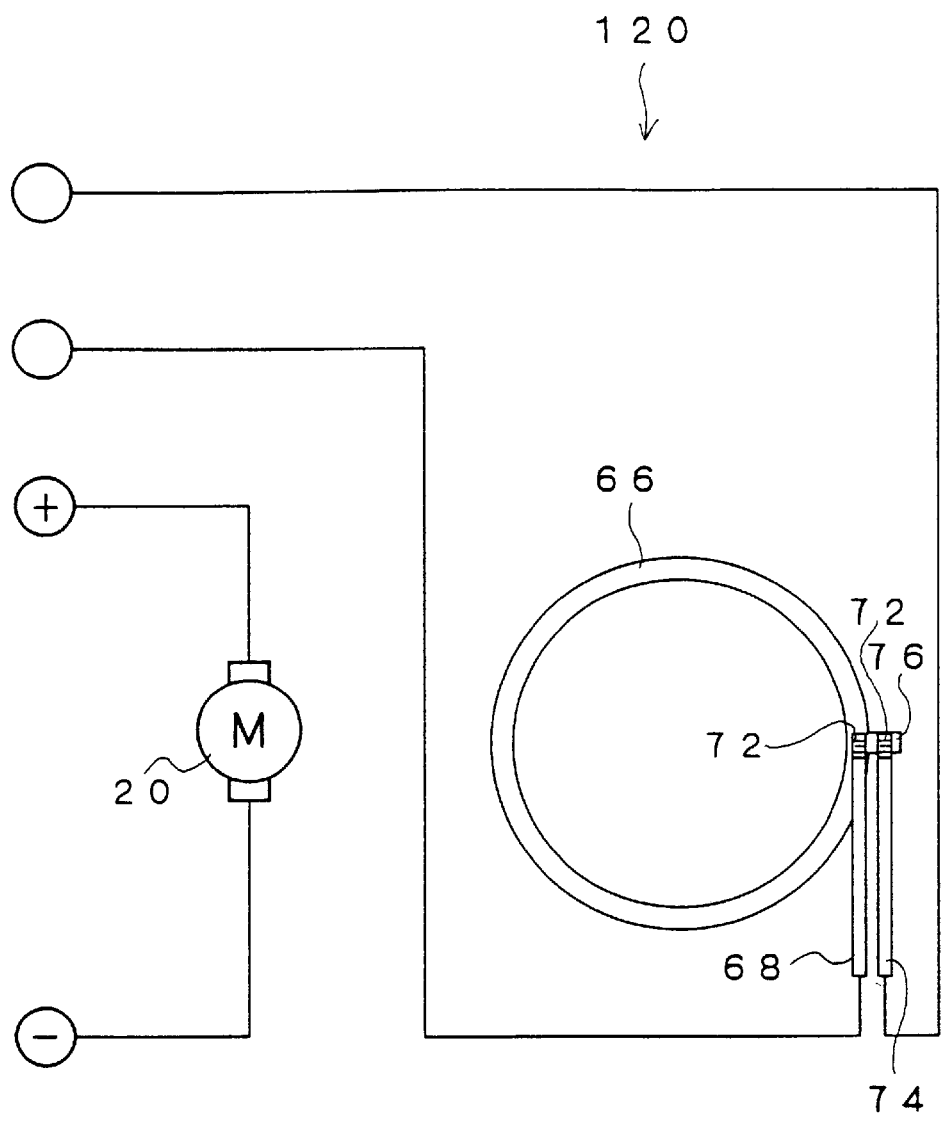
FIG. 11 is a schematic circuit diagram of a motor actuator control system according to the second modification of the embodiment.
Figure 12:
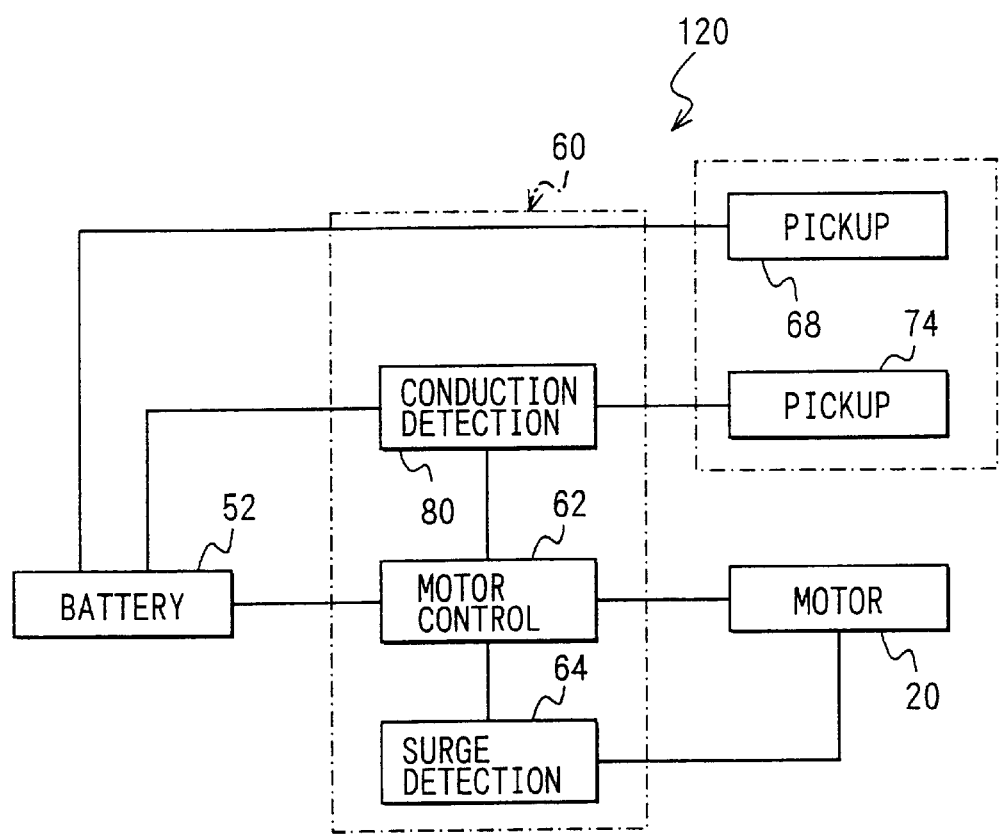
FIG. 12 is a schematic block diagram of the motor actuator control system according to the second modification.

As shown in FIGS. 11 and 12, the motor circuit including the motor 20 and another circuit including the pickups 68, 74 are separately connected to the battery 52 in a motor actuator control system 120. Therefore, the conduction current passed between the pickups 68, 74 is not affected by a fluctuation of the motor current. Thus, the detection of the conduction current by the conduction detection circuit 80 is improved.

(Third Modification)

Figure 13:
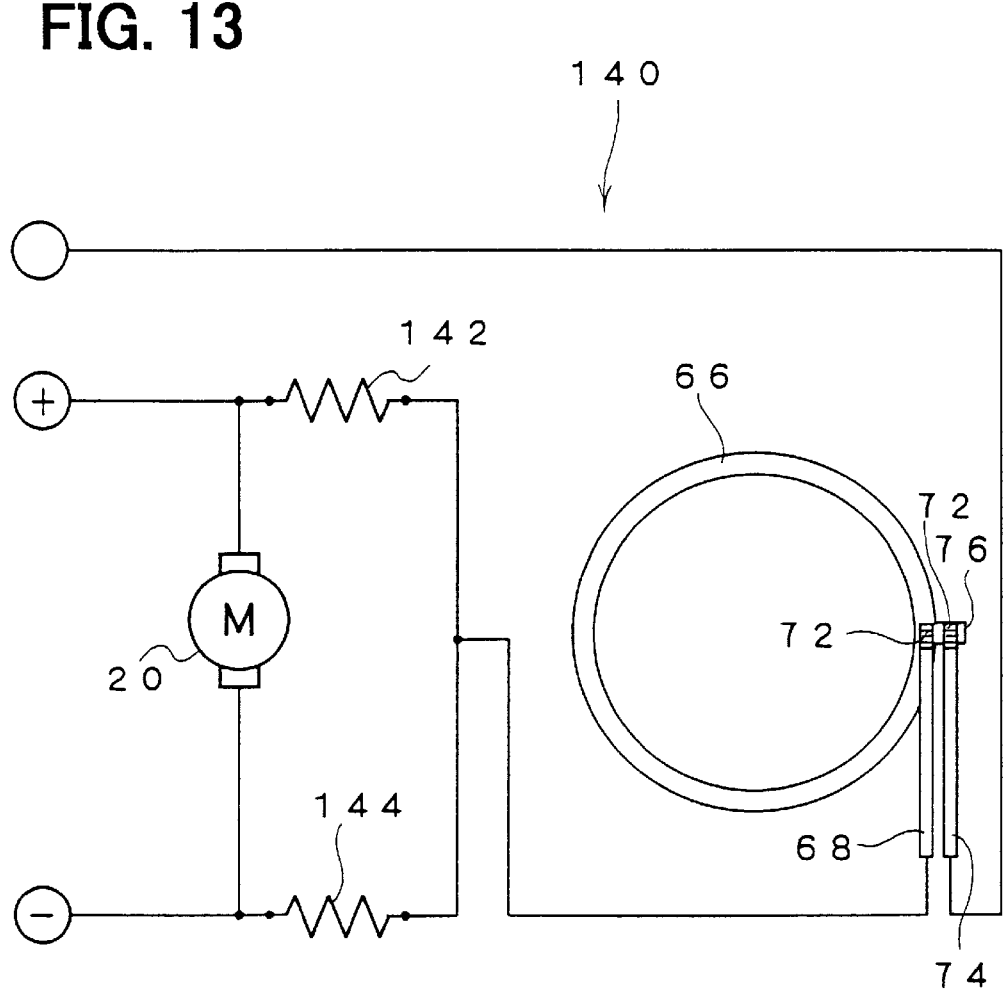
FIG. 13 is a schematic circuit diagram of a motor actuator control system according to the third modification of the embodiment.

As shown in FIG. 13, a resistor 142 is disposed between the pickup 68 and the positive pole of the battery 52, which is connected to one brush 50 in a motor actuator control system 140. Another resistor 144 is disposed between the pickup 68 and the negative pole of the battery 52, which is connected to the other brush 50. The pickup 74 is connected to the conduction detection circuit 80 as in the system 10 in the embodiment.

In the case that the resistors 142, 144 have the same resistance, the circuit 80 incurs half the voltage of the battery 52 when the conduction between the pickups 68, 74 is made. This circuit structure also enables the conduction detection circuit 80 to detect preferably the conduction current between the pickups 68, 74.

(Other Modifications)

Figure 14:
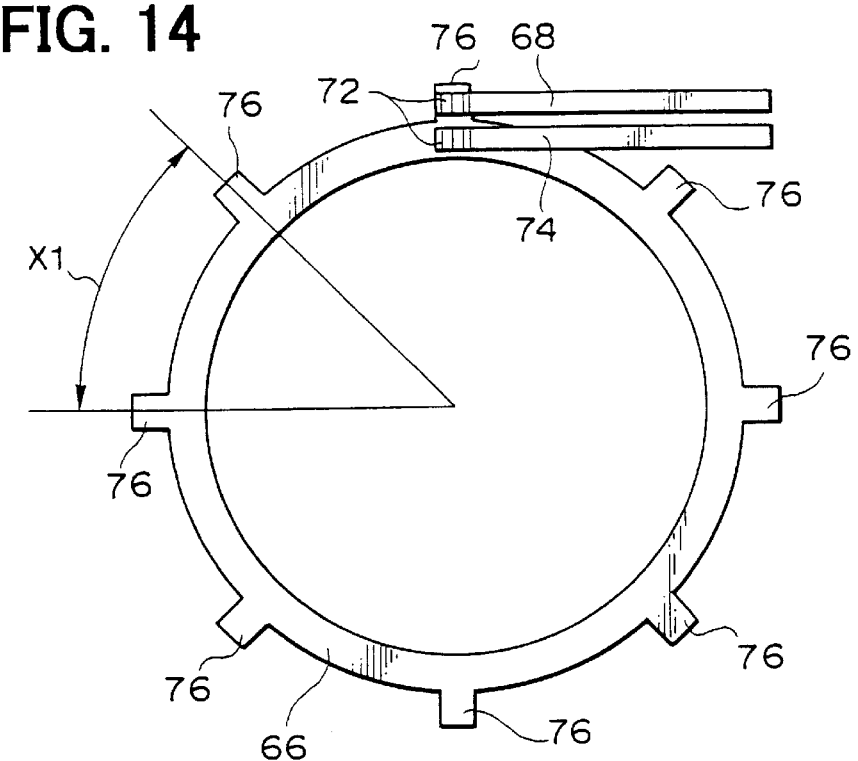
FIG. 14 is a plan view showing a modified pulse plate (conductive part, ring-shaped part) according to other modification of the embodiment.

In above embodiment and modifications, a single projection part 76 is formed. However, a plurality of projection parts 76 may be formed at constant angular interval X1, as shown in FIG. 14. Eight projection parts are formed with forty-five degree angular intervals in FIG. 14. In this case, at least one conduction between the pickups 68, 74 is made, namely at least one conduction signal is sent from the conduction detection circuit 80 to the motor control circuit 62, when the output gear 34 is rotated by forty-five degrees or more.

In the case that the circuit 62 is programmed to cancel a second and later conduction signals, a motor actuator control system in this modification performs in the same manner as the system 10 in the embodiment. In the case that the circuit 62 is programmed to correct the count N using a plurality of predetermined counts NA every time the conduction signal is detected, the motor 20 is more accurately controlled due to the multiple correction.

Figure 15:
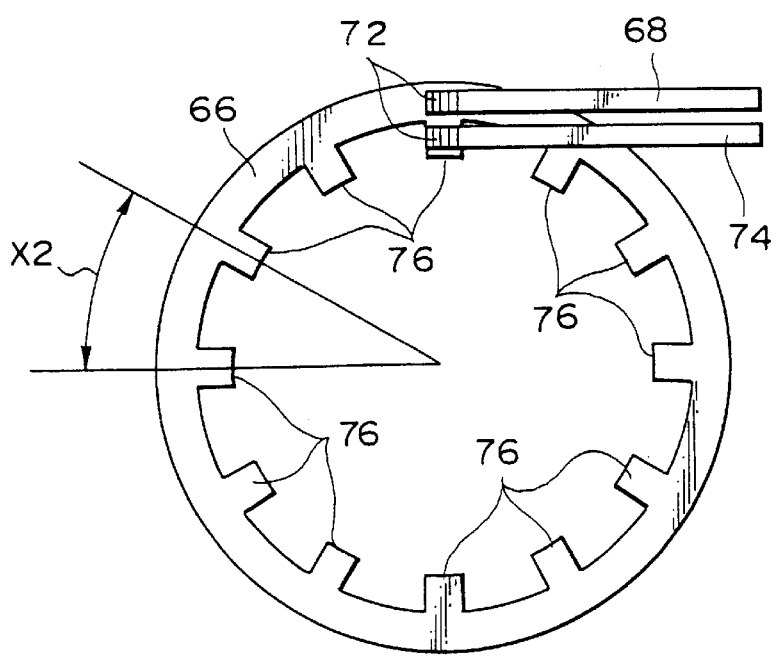
FIG. 15 is a plan view showing another modified pulse plate (conductive part, ring-shaped part) according to other modification.

In the above embodiment and modifications, each projection part 76 protrudes outwardly from the pulse plate 66. However, each projection part 76 may protrudes inwardly from the pulse plate 66. In FIG. 15, a plurality of projection parts 76 protruding inwardly from the pulse plate 66 is formed with constant angular intervals X2. Twelve projection parts are formed with thirty degree angular interval in FIG. 15.

The constant angular interval X1, X2 is set to be smaller than a predetermined operation angle of the output shaft 35 formed on the output gear 34 in order to reliably detect the rotational position of the output gear 34 within the operation angle. For example, in the case that the predetermined angle is sixty degrees, at least seven projection parts 76 are needed to provide the constant angular interval X1, X2 that are smaller than the operation angle.

In the case that only one projection part 76 is formed on the output gear 34, the position of the gear 34 in the rotational direction needs to be adjusted such that the projection part 76 contacts the pickup 74 within the operation angle of the output shaft 35 when the output gear 34 is assembled. However, if a plurality of projection parts 76 is formed at the constant angular interval X1, X2 that are smaller than the operation angle, the position adjustment is needless. Therefore, the assembly becomes easier.

In the above embodiment and modifications, the rotational position of the output gear 34 is correlated with the count N of the commutator current surges by substituting a predetermined number NA for the count N unless the count N and the number NA are equal at the moment that the motor control circuit 62 receives the conduction signal from the conduction detection circuit 80. However, the rotational position of the output gear 34 may be correlated with the count N of the commutator current surges by starting to count the commutator current surges at the moment that the circuit 62 receives the conduction signal from the circuit 80.

In the above embodiment and modifications, the rotational position of the gear 34 is detected using the electric signal generated by a mechanical switch constituted of the pickups 68, 74, the pulse plate 66, and the projection part 76. However, instead of the mechanical switch, other means such as an optical sensor and a magnetic sensor may be used.

In the above embodiment and modifications, the motor actuator control system 10, 100, 120, 140 according the present invention is used in the air conditioning system 82. However, as a matter of course, the system is not limited to the application and may be applied to other systems in which at least one motor actuator is used.

What is claimed is:

1. A motor actuator control system comprising:

a motor having a commutator and a pair of brushes so that an electric current is passed to the commutator through the brushes;

an output shaft for outputting rotational motion of the motor at reduced rotational speed;

a gear train comprising a plurality of gears for transmitting rotational motion of the motor to the output shaft while reducing rotational speed, wherein the gear train includes a first gear, which is driven directly by the motor, and a second gear, which is coupled to the first gear;

a motor rotational position detector for detecting current surges generated when contact between the commutator and the brushes is broken, wherein each current surge indicates a degree of motor rotation;

an output shaft rotational position detector for detecting rotational position of the second gear; and a control unit for controlling the motor on a basis of the rotational position of the second gear and a count of the current surges.

2. The system as in claim 1, wherein the second gear is an output gear, which is connected to the output shaft and is rotated at the slowest speed in the gear train.

3. The system as in claim 1, wherein the output shaft rotational position detector includes a switch comprising:
   an electrically conductive member formed on the second gear wherein the electrically conductive member is rotated synchronously with the second gear; and
   first and second pickups associated with the conductive member such that both pickups contact the conductive member and form a switch that is turned on only when the second gear reaches a predetermined rotational position.

4. The system as in claim 3, wherein:
   the first pickup is in continuous contact with the conductive member, and
   the second pickup is in contact with the conductive member to turn on the switch only when the second gear reaches a predetermined rotational position.

5. The system as in claim 4, wherein the conductive member includes:
   a ring-shaped part, which is concentric with the second gear and in continuous contact with the first pickup; and
   a projection part which protrudes from the ring-shaped part in a radial direction of the ring-shaped part and is in contact with the second pickup to turn on the switch only when the second gear reaches a predetermined rotational position.

6. The system as in claim 5, wherein:
   the output shaft is rotatable within a predetermined angle to drive a member used to change air passages in an air conditioning system; and
   a plurality of projection parts are formed such that a maximum angular interval between the projection parts is smaller than the predetermined angle.

7. The system as in claim 6, wherein the predetermined angle is sixty degrees.

8. A motor actuator comprising:
   a motor having a commutator and a pair of brushes, so that electric current is passed to the commutator through the brushes;
   an output shaft for delivering rotational motion from the motor to at reduced rotational speed;
   a gear for transmitting rotation of the motor to the output shaft while reducing rotational speed;
   a motor rotational position detector for detecting and counting current surges generated when contact between the commutator and the brushes is broken, wherein each current surge indicates a degree of motor rotation;
   an output shaft rotational position detector for detecting at least one angular position of the gear; and
   a control unit for controlling the motor on a basis of detection of the angular position of the gear and a count of the current surges.

9. The actuator according to claim 1, wherein the gear is an output gear of a gear train, wherein the gear is connected to the output shaft and is rotated at the slowest speed in the gear train.

10. The actuator according to claim 1, wherein the output shaft rotational position detector includes a switch comprising:
    an electrically conductive member formed on the gear, wherein the electrically conductive member is rotated synchronously with the gear; and
    first and second pickups associated with the conductive member such that both pickups contact the conductive member and form a switch that is turned on only when the gear reaches a predetermined rotational position.

11. The actuator according to claim 10, wherein:
    the first pickup is in continuous contact with the conductive member; and
    the second pickup is in contact with the conductive member to turn on the switch only when the gear reaches a predetermined rotational position.

12. The actuator according to claim 11, wherein the conductive member includes:
    a ring-shaped part, which is concentric with the gear and in continuous contact with the first pickup; and
    a projection part which protrudes from the ring-shaped part in a radial direction of the ring-shaped part and is in contact with the second pickup to turn on the switch only when the gear reaches a predetermined rotational position.

13. The actuator according to claim 12, wherein:
    the output shaft is rotatable within a predetermined angle to drive a member used to change air passages in an air conditioning system; and
    a plurality of projection parts are formed such that a maximum angular interval between the projection parts is smaller than the predetermined angle.

14. The actuator according to claim 13, wherein the predetermined angle is sixty degrees.

\* \* \* \* \*